United States Patent [19]

Bohringer

[11] 3,891,892

[45] June 24, 1975

[54] START-UP CONTROL CIRCUIT FOR SCR DEFLECTION

[75] Inventor: Walter Bohringer, Schlieren, Switzerland

[73] Assignee: RCA Corporation, New York, N.Y.

[22] Filed: Dec. 4, 1973

[21] Appl. No.: 421,704

[30] Foreign Application Priority Data

Sept. 12, 1973 Switzerland ........................ 42812/73

[52] U.S. Cl. ................................................ 315/411

[51] Int. Cl. ............................................ H01j 29/70

[58] Field of Search ......... 315/27 R, 27 TD, 28, 29, 315/20, 411, 379

[56] References Cited

UNITED STATES PATENTS

| | | | |
|---|---|---|---|
| 3,646,392 | 2/1972 | Zahnen et al. | 315/29 |
| 3,742,242 | 6/1973 | Morio et al. | 315/29 |
| 3,767,960 | 10/1973 | Ahrens | 315/27 TD |
| 3,819,979 | 6/1974 | Truskalo | 315/29 |

*Primary Examiner*—Maynard R. Wilbur
*Assistant Examiner*—J. M. Potenza
*Attorney, Agent, or Firm*—Eugene M. Whitacre; Paul J. Rasmussen

[57] ABSTRACT

A boost voltage delay circuit for deflection circuit utilizing trace and commutating switches to generate deflection current in a deflection winding. A supply voltage boost circuit derives voltage from an inductor coupled between the direct current voltage supply and the commutating switch, boosts and regulates it, and supplies this regulated boost voltage to the commutating switch. The boost voltage delay circuit monitors the commutation switching action by rectifying voltage variations appearing across the inductor to charge an R-C circuit for several cycles of commutation switching action before the voltage across the R-C circuit rises sufficiently to turn on a transistor which enables the boost voltage circuit to supply boost voltage to the commutating switch. Commutation loss due to failure of the commutating switch to become reverse biased under applied boost voltage is thereby prevented.

9 Claims, 1 Drawing Figure

PATENTED JUN 24 1975 3,891,892
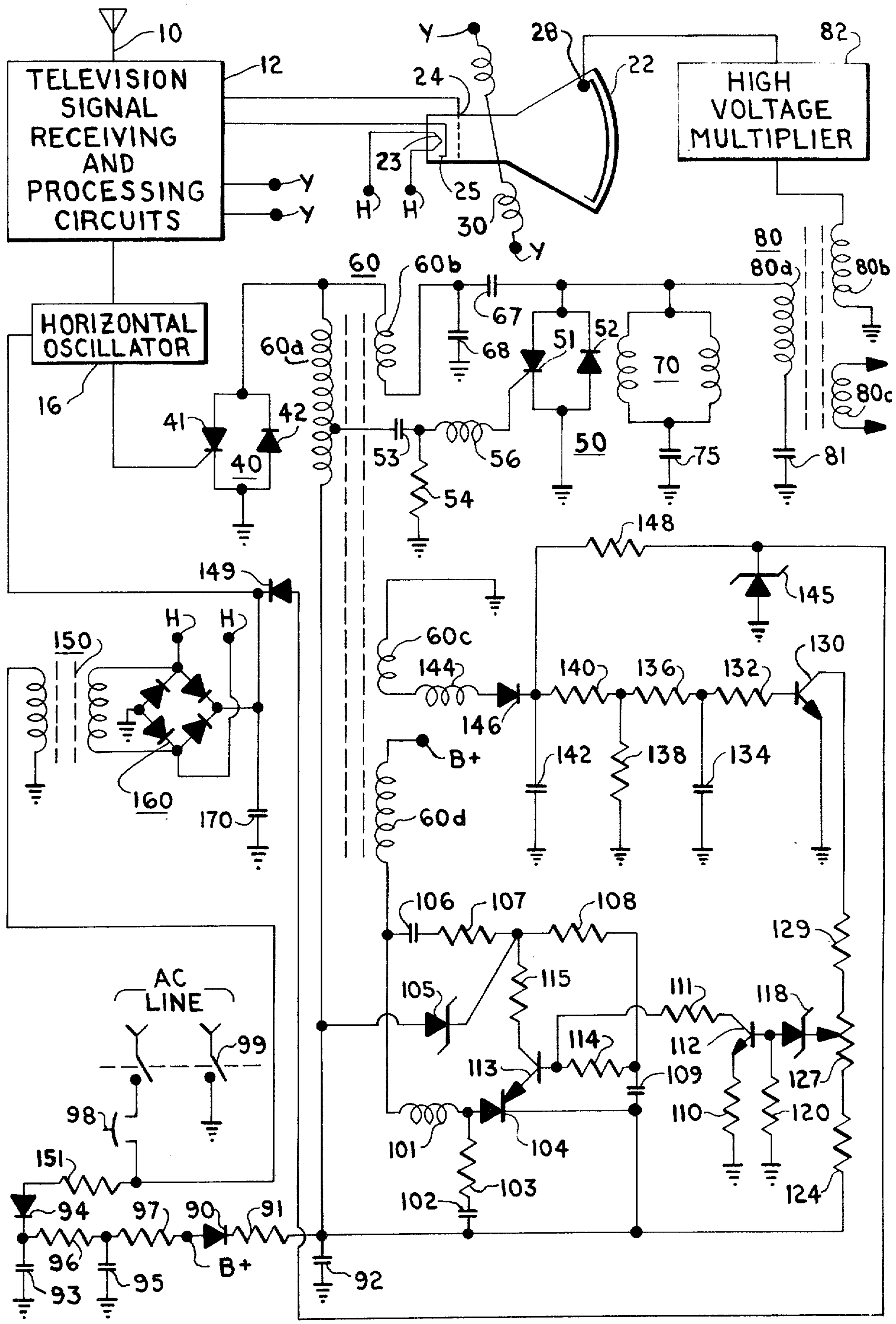

START-UP CONTROL CIRCUIT FOR SCR DEFLECTION

BACKGROUND OF THE INVENTION

This invention relates to boost voltage delay circuits for use during start-up of deflection systems in television receivers.

Silicon controlled rectifier (SCR) deflection circuits are presently employed in some types of television receivers to generate operating voltage for receiver circuits in addition to supplying deflection scanning current because the SCR devices have relatively high power handling capability. Regulation of the operating voltage of the deflection circuit is desirable in order to isolate the receiver circuits from variations in the line voltage. If unregulated rectified line voltage were used to drive the horizontal deflection system, variations in the line voltage would cause the picture width to vary undesirably. Additionally, fluctuations in the unregulated rectified line voltage being supplied to the horizontal deflection system and in the intensity of the electron beam impinging on the kinescope viewing surface might result in variations in the voltages derived from the horizontal deflection system thereby causing fluctuations in output signals from other circuits being supplied with operating voltage from the horizontal deflection system. For example, if vertical deflection power were being derived from a horizontal deflection system without regulation, the vertical height would vary with variations in the unregulated input voltage to the horizontal deflection system.

In television receivers utilizing SCR deflection systems, combination boost voltage rectifying circuits and voltage regulating circuits may be used to insure that the sum of the voltage supplied from a conventional diode rectifier and a rectified boost voltage derived from the deflection system switching action will be constant. Sufficient regulation of all of the power supplied from the SCR deflection circuit to other receiver circuits may also be achieved by boosting the alternating line voltage and regulating the sum of the rectified and filtered line voltage and the generated boost voltage.

A problem may arise, however, in some situations when a boost voltage generator and regulator is used in conjunction with an SCR deflection system. The SCRs in such systems are switched on by appropriate positive gating pulses applied to their control electrodes and are switched off by being rendered reverse biased. However, in the situation in which a boost voltage regulator is used, boosted operating voltage applied too quickly to the commutating SCR after turn-on of the receiver may prevent that device from becoming reverse biased. The commutating SCR thus fails to turn off to initiate the second half of the horizontal deflection retrace interval. This phenomenon, frequently referred to as loss of commutation, results in the commutation SCR shorting the power supply and causing the receiver's internal circuit breaker or power supply fuse to open, necessitating resetting of the circuit breaker or replacement of the fuse.

SUMMARY OF THE INVENTION

In accordance with the present invention a boost voltage delay system for switching loss protection in a deflection system includes a deflection winding, a source of direct current voltage, inductive means coupled to the direct current voltage source and first and second deflection switching means coupled to one another and to the deflection winding and to the inductive means. The first switching means is operative from a first state to a second state for providing a current path through the inductive means for a portion of each deflection cycle. Controllable voltage generating and rectifying means are coupled to the direct current voltage supply and to the inductive means and generate, rectify and add boost voltage to the direct current voltage in response to current flow through the inductive means. Boost voltage delaying means including rectifying means are coupled to the inductive means and to the controllable voltage generating and rectifying means for generating signals in response to the flow of current through the inductive means and for rectifying the signals in the rectifying means for supplying a delayed control voltage for the controllable voltage generating and rectifying means for delaying the supply of rectified boost voltage to the first switching means.

An additional feature of the invention is that rectified voltage developed in the boost voltage delaying means may be used to supply delayed operating voltage to other circuits such as a deflection rate generator. Voltage so supplied may be made sufficient to permit operation of such circuits until some predetermined time after the direct current source voltage becomes insufficient to sustain their operation after the direct current voltage source is de-energized.

The invention may best be understood by referring to the following description and accompanying drawing which is a partly block and partly schematic diagram of a television receiver which utilizes the present invention.

DESCRIPTION OF THE PREFERRED EMBODIMENT

In the FIGURE, composite television signals received on an antenna 10 are coupled to television signal receiving and processing circuits 12. Television signal receiving and processing circuits 12 include a tuner, R.F. and I.F. amplifiers, video and audio detectors, video and audio amplifiers, and in color receivers, chrominance and chrominance control circuitry. Additionally, television signal receiving and processing circuits 12 include a sync separator and a vertical deflection waveform generator and amplifier. The vertical deflection output amplifier is coupled through terminals Y—Y to a pair of vertical deflection windings 30 associated with a kinescope 22. The circuitry of block 12 is coupled through one or more cathodes represented by a cathode 25 and through one or more grids represented by a grid 24 to kinescope 22. A heater filament 23 associated with cathode 25 of kinescope 22 heats cathode 25 and causes it to emit electrons with a higher efficiency when a voltage is impressed across terminals H—H.

Power for operating the receiver is supplied from the alternating current line voltage supply through a switch 99. One of the terminals of switch 99 is grounded when the switch is closed and the other is coupled through a circuit breaker 98 to one terminal of a primary winding of a low voltage transformer 150, the other terminal of which is also grounded. A secondary winding of transformer 150 is coupled across a conventional full-wave rectifier assembly 160. The negative terminal of rectifier assembly 160 is coupled to ground and the positive terminal of rectifier assembly 160 is coupled to one terminal of a filter capacitor 170, the other terminal of which is grounded. The secondary winding of transformer 150 is also coupled across heater filament 23 of kinescope 22 and supplies alternating heater current thereto through terminals H—H immediately after switch 99 is closed.

The junction of circuit breaker 98 and the primary winding of transformer 150 is coupled through a current limiting resistor 151 to the anode of a rectifying diode 94. The cathode of diode 94 is coupled to one terminal of a first filter capacitor 93, the other terminal of which is coupled to ground. The junction of diode 94 and capacitor 93 is coupled through a resistor 96 to the junction of a second filter capacitor 95 and a resistor 97. The remaining terminal of capacitor 95 is coupled to ground. The remaining terminal of resistor 97 is coupled to the anode of a blocking diode 90 and supplies direct current supply voltage B+ thereto. Diode 90 prevents a voltage higher than B+ appearing at its cathode from raising the voltage at its anode.

The sync separator in block 12 is coupled to a horizontal oscillator 16 and supplies horizontal sync pulses thereto. The ungrounded terminal of filter capacitor 170 in the bridge rectifier circuit is also coupled to horizontal oscillator 16 and supplies low voltage direct current operating potential to horizontal oscillator 16 for a brief time interval immediately after switch 99 is closed. Signals from horizontal oscillator 16 are coupled to the gate electrode of an SCR 41 of a bidirectional conducting commutating switch 40. The cathode of SCR 41 is coupled to ground and its anode is coupled to one terminal of a winding **60*a*. Winding 60*a* is the primary winding of an input reactor 60 comprising winding 60*a*, a commutating coil winding 60*b*, a winding 60*c*, and a winding 60*d*. The cathode of a diode 42 is coupled to the anode SCR 41 and the anode of diode 42 is grounded. The combination of SCR 41 and diode 42 comprises commutating switch 40**.

The cathode of diode 42 is also coupled to one terminal of commutating coil winding **60*b*. The other terminal of winding 60*b* is coupled through an auxiliary capacitor 68 to ground and through a commutating capacitor 67 to the anode of an SCR 51. The cathode of SCR 51 is grounded. The anode of SCR 51 is also coupled to the cathode of a diode 52 and the anode of diode 52 is grounded. The combination of SCR 51 and diode 52 comprises a bidirectional conducting trace switch 50. The anode of SCR 51 is also coupled to a pair of horizontal deflection windings 70. The other terminal of horizontal deflection windings 70 is coupled through an S-shaping capacitor 75** to ground.

The anode of SCR 51 is also coupled to one terminal of a primary winding **80*a* of a horizontal output transformer 80. The other terminal of winding 80*a* is coupled through a direct current blocking capacitor 81 to ground. Output transformer 80 also includes a high voltage winding 80*b* and an auxiliary winding 80c. One terminal of winding 80*b* is grounded and its other terminal is coupled to high voltage multiplier 82 which multiplies and rectifies the horizontal retrace pulses. An output terminal of high voltage multiplier 82 supplies high voltage to a high voltage terminal 28 of kinescope 22. Winding 80*c*** may be used to supply alternating current voltage to another rectifier circuit for providing operating voltage to other circuits in the television receiver.

A tap of winding **60*a* is coupled to one terminal of a capacitor 53, the other terminal of which is coupled through a resistor 54 to ground. The junction of capacitor 53 and resistor 54 is coupled through an inductor 56 to the gate electrode of SCR 51. Circuit elements 53, 54, and 56 comprise a network for shaping the waveform coupled to the gate electrode of trace SCR 51. The remaining terminal of winding 60*a* is coupled to one terminal of a boost voltage storage capacitor 92, the other terminal of which is grounded. The ungrounded terminal of capacitor 92 is coupled through a resistor 91 to the cathode of diode 90 for supplying approximately B+ voltage across capacitor 92. As was mentioned previously, diode 90 blocks boosted B+ voltage from being returned to the B+ voltage generated in the line voltage rectifier and filter circuit comprising elements 93, 94, 95, 96, and 97**.

In the boosted B+ voltage generator and regulator, one terminal of winding **60*d* is coupled to the source of direct current voltage B+ and the other terminal of winding 60*d* is coupled through an inductor 101 to the anode of SCR 104. Inductor 101 controls the rate of change of current as SCR 104 becomes reverse biased thereby controlling the time at which SCR 104 turns off. A series combination of a capacitor 102 and a resistor 103 is coupled between the ungrounded terminal of capacitor 92 and the anode of SCR 104. The cathode of SCR 104 is also coupled to the ungrounded terminal of capacitor 92**.

The junction of winding **60*d* and inductor 101 is coupled through a capacitor 106 and a resistor 107 to the cathode of a zener diode 105. The anode of zener diode 105 is coupled to the ungrounded terminal of capacitor 92. Zener diode 105 is selected so that during normal receiver operation it clips positive voltage appearing on its cathode regardless of variations in the peak-to-peak voltage across winding 60*d*. The cathode of zener diode 105 is also coupled through a series combination of a resistor 108 and a resistor 114 to the base of a transistor 113. A capacitor 109 is coupled from the junction of resistors 108 and 114 to the ungrounded terminal of capacitor 92. In addition, the cathode of zener diode 105 is coupled through a series resistor 115 to the collector of transistor 113 and supplies operation potential thereto. The emitter of transistor 113 is coupled to the gate electrode of SCR 104 for providing gating current to SCR 104 when transistor 113** is in a state of conduction.

A sawtooth voltage is developed across capacitor 109 during the commutating interval. This sawtooth voltage represents the clipped voltage appearing across zener diode 105 in the reverse direction during the commutating interval, i.e., when voltage variations appear across winding **60*d*, as integrated in the integrating circuit comprising resistor 108 and capacitor 109**.

The ungrounded terminal of capacitor 92 is coupled through a resistor 124, a potentiometer 127 and a resistor 129 to the collector of a transistor 130. An adjustable wiper of potentiometer 127 is coupled to the cathode of a zener diode 118. The anode of zener diode 118 is coupled through a resistor 120 to ground. The anode of zener diode 118 is also coupled to the base of a transistor 112. The emitter of transistor 112 is coupled through a resistor 110 to ground. The collector of transistor 112 is coupled through a resistor 111 to the base of transistor 113.

One terminal of winding **60*c* is grounded and its other terminal is coupled through an inductor 144 to the anode of a rectifier diode 146. The cathode of diode 146 is coupled through a capacitor 142 to ground and through a resistor 140 and a resistor 138 in series to ground. The cathode of diode 146 is also coupled to one terminal of a current limiting resistor 148**.

The other terminal of resistor 148 is coupled to the cathode of a zener diode 145 and to the anode of a blocking diode 149. The anode of zener diode 145 is coupled to ground. The cathode of diode 149 is coupled to the ungrounded terminal of capacitor 170. The junction of resistor 140 and resistor 138 is coupled through resistor 136 to the junction of a capacitor 134 and a resistor 132. The remaining terminal of capacitor 134 is grounded. The remaining terminal of resistor 132 is coupled to the base of transistor 130. The emitter of transistor 130 is grounded.

The operation of the deflection circuit consisting of commutating switch 40, input reactor 60*a*, commutating winding 60*b*, commutating capacitor 67, auxiliary capacitor 68, trace switch 50, deflection winding 70, trace capacitor 75, and flyback primary winding 80*a* of the FIGURE is described in detail in U.S. Pat. No. 3,452,244 issued to W. F. W. Dietz and entitled, "Electron Beam Deflection and High Voltage Generation Circuit" but a brief description of its operation is set forth here to aid in understanding the present invention.

In the circuit of the FIGURE, at the beginning of the trace interval, diode 52 is forward biased by virtue of the voltage established across deflection windings 70. Diode 52 conducts a linearly decreasing current which flows through horizontal deflection winding pair 70 to charge capacitor 75 as energy is recovered from a collapsing magnetic field in windings 70. At some point shortly before the current through deflection winding pair 70 reaches zero, SCR 51 has been placed in condition for conduction by a gating pulse supplied from input reactor 60a through the wave-shaping circuitry comprising elements 53, 54, and 56.

Capacitor 75 is a large capacitor and therefore provides a substantially constant voltage across deflection winding pair 70 when trace switch 50 is closed. As SCR 51 becomes conductive, capacitor 75 begins to discharge through winding pair 70 causing a reversal of current through windings 70 at the midpoint of the trace interval. Diode 52 has become reverse biased by virtue of the low voltage across deflection winding pair 70 midway through the trace interval and SCR 51, which has been placed in a conductive state by virtue of the before mentioned gating pulse, now begins to conduct current in a linearly increasing manner through deflection winding pair 70 in the opposite direction to discharge capacitor 75. The conduction of SCR 51 thereby establishes the second half of the trace interval.

A short time, approximately 8 microseconds, before the end of the second half of the trace interval, a positive going gating pulse is supplied by horizontal oscillator 16 to the gate electrode of SCR 41. Capacitors 67 and 68, which have become positively charged by conduction through input reactor 60*a*, now begin to discharge through commutating SCR 41. The discharge of capacitors 67 and 68 in the reverse direction through SCR 51 causes more current to flow in the reverse direction through SCR 51 than in the forward direction. Therefore, trace SCR 51 quickly becomes reverse biased as discharge current for capacitors 67 and 68 through SCR 41 increases to a higher value than the trace interval current flowing in the forward direction through SCR 51. The reverse biasing of trace SCR 51 initiates the retrace interval.

During the retrace interval current first flows through retrace SCR 41 and the now forward biased trace diode 52 as commutating capacitor 67 and auxiliary capacitor 68 continue to discharge. Also during this interval, the discharging of capacitors 67 and 68 supplies energy to commutating inductor 60*b*. The magnetic field thereby established in inductor 60*b* causes forward current to continue to flow in commutating SCR 41 after capacitors 67 and 68 have completely discharged, causing a charge to build up across capacitors 67 and 68 in the opposite direction. Commutating SCR 41 and trace diode 52 both become reverse biased by the charge thus established across capacitors 67 and 68.

At this time, as the current in the commutating capacitor 67 begins to reverse, energy is supplied to primary winding 80*a* of flyback transformer 80. As capacitor 67 supplies energy to primary winding 80*a*, trace capacitor 75 and deflection winding pair 70 also begin to transfer energy to winding 80*a* as they oscillate one-half cycle with the inductance of winding 80*a* and the capacitance of blocking capacitor 81. This transfer of energy from commutating capacitor 67, trace capacitor 75, and deflection winding 70 supplies the energy to winding 80*a* to generate the flyback pulse.

Capacitors 67 and 68 now begin to discharge through deflection winding pair 70 and capacitor 75 in the opposite direction by virtue of the voltage established at the junction of capacitors 67 and 68 which is negative with respect to ground. It is at this time that energy is added to capacitor 75 to compensate for dissipation losses occurring during the deflection cycle. Commutating SCR 41 and trace diode 52 are reverse biased by this voltage and commutating diode 42 becomes forward biased to conduct retrace current during the second half of the retrace interval. At the end of the retrace interval, the junction of diode 52 and deflection winding pair 70 goes negative with respect to ground by virtue of the energy stored in deflection winding pair 70 by current flowing through it in the second half of the retrace interval and the magnetic field in deflection winding 70 begins to collapse again causing trace diode 52 to conduct, thereby initiating the next succeeding trace interval.

The operation of B+ boost voltage generator and regulator is described in copending U.S. Pat. application, Ser. No. 344,296, filed by W. F. W. Dietz and entitled "Horizontal Deflection System with Boosted B+" but will be briefly described here to aid in understanding the present invention. The operation of the horizontal deflection circuit outlined above, and particularly the switching action of switch 40, generates voltage variations across a secondary winding 60*d* of reactor 60 by virtue of the current flow through input reactor 60*a* which is the primary winding of reactor 60. When SCR 104 is gated into conduction during each deflection cycle, it rectifies voltage variations appearing at its anode during the commutating interval when current flows through input reactor 60*a*. Since it takes energy from the horizontal deflection system only during the commutating interval, its operation has little effect on the trace interval current generated in deflection windings 70.

Boosted B+ voltage obtained by rectifying the AC voltage waveform developed in winding 60*d*, appears at the cathode of SCR 104 and is stored in capacitor 92. Capacitor 92 supplies this boosted B+ voltage to the deflection circuit through input reactor 60*a*. The conduction time of SCR 104, which establishes the amount of boosted B+ voltage added to capacitor 92, is controlled by the current through transistor 113, and the conductivity of transistor 113 is controlled by the boost voltage developed across winding 60d as applied to the base of transistor 113 through the sawtooth waveshaping circuitry comprising zener diode 105, capacitors 106 and 109, resistors 107 and 108 and the voltage developed across resistor 114.

During normal operation of the receiver, i.e., when transistor 130 is in saturation after the first few cycles of operation following receiver turn-on, when the line voltage is low the direct current supply voltage across capacitor 92 is also low. This causes transistor 112 to be less conductive so its collector voltage, and consequently the direct current voltage on the base of transistor 113, to be higher. The average value of the sawtooth-shaped voltage developed across capacitor 109 will thereby be higher and SCR 104 will conduct for a substantially greater portion of the commutating interval. As a result of this longer conducting interval, a higher voltage will be established at the cathode of SCR 104 and across capacitor 92.

When the line voltage is high, the voltage across capacitor 92 will similarly be high and transistor 112 will be in a more conductive state than with the nominal alternating current line voltage. Thus the voltage at the collector of transistor 112 and therefore the sawtooth voltage developed across capacitor 109 and at the base of transistor 113 will have a lower average value. As a result, transistor 113 and hence SCR 104 will conduct during a smaller portion of the commutating interval and a lower voltage will result across capacitor 92.

One terminal of auxiliary winding 60*c* of transformer 60 is grounded. Current variations through input reactor 60*a* as the deflection circuit operates cause corresponding voltage variations at the junction of winding 60*c* and inductor 144. These variations are rectified by diode 146 and cause charging of capacitor 142. The voltage stored in capacitor 142 is supplied through the resistive ladder network comprising resistors 136, 138, and 140 to capacitor 134. The charging voltage of capacitor 134 thereby represents a delayed indication of the charging voltage across capacitor 142.

Since the voltage across capacitor 142 is an indication of the operation of the deflection circuit, the charging voltage across capacitor 134 is a delayed indication of the operation of the deflection circuit as indicated by the conduction of current through input reactor 60*a*, the primary winding of transformer 60. The delayed increase of the voltage across capacitor 134 is supplied through resistor 132 to the base of transistor 130. The charging voltage across capacitor 134 thereby controls the conductivity of transistor 130.

Immediately after the television receiver has been turned on, the voltage across capacitor 134 will be low and transistor 130 will be nonconductive. Voltage supplied to capacitor 92 immediately after the receiver is turned on as B+ voltage is being established across capacitor 92 will cause transistor 112 to be driven into saturation and transistor 113 to remain nonconductive. Therefore SCR 104 will remain nonconductive and no boosted voltage will be supplied through SCR 104 to increase the voltage across capacitor 92. Therefore, commutating switching SCR 41 will see no boosted B+ voltage.

As the deflection circuit operates for several horizontal deflection cycles, the rectified voltage supplied through diode 146 to capacitor 142 will increase, resulting in gradually increasing voltage across capacitor 134 and a corresponding gradual increase in conduction by transistor 130. More of the voltage present across capacitor 92 will thereby be dropped across resistor 124 which will tend to lower the voltage at the wiper of potentiometer 127 and decrease the conductivity of transistor 112, resulting in an increase in the conductivity of transistor 113 and SCR 104 and a higher voltage across capacitor 92. Thus, the voltage across capacitor 92 will gradually increase toward the boosted B+ level and the voltage at the anode of commutating switching SCR 41 will similarly increase toward the boosted B+ level. The rate at which the voltage across capacitor 92 increases from the B+ level to the boosted B+ level depends upon the time constant of the delay circuit.

Shortly after the voltage across capacitor 142 reaches its maximum operating level, transistor 130 will reach peak conductivity and transistor 112 will begin to function as the regulating device for the boosted B+ voltage across capacitor 92. An increase in the voltage across capacitor 92 will cause a corresponding increase in the voltage at the base of transistor 112 thereby decreasing the conductivity of transistor 113. Decreasing conductivity by transistor 113 results in a shorter "on" time for SCR 104 thereby lowering the voltage across capacitor 92 toward the nominal boosted B+ level. Conversely, a lower voltage across capacitor 92 results in a lower voltage on the base of transistor 112 raising the conductivity of transistor 113 and SCR 104. The increasing conductivity of SCR 104 tends to raise the voltage across capacitor 92 to the nominal boosted B+ level.

Thus it may be seen that winding 60*c*, rectifier 146, transistor 130, and their associated circuitry function to disable SCR 104 immediately upon turn-on of the television receiver and hold SCR 104 in a nonconductive state until several cycles of operation of commutating SCR 41 have caused a sufficiently high direct current voltage to be established across capacitor 142 to turn-on transistor 130. This delay insures that commutating SCR 41 is functioning properly for a substantial amount of time before boost voltage is added to the B+ voltage supplied to capacitor 92, and thus to commutating SCR 41, through the boost voltage rectifier, SCR 104.

Additionally, immediately after turn-on of the receiver, the voltage on the ungrounded terminal of capacitor 170 rises to some positive value to provide direct current operating voltage to horizontal oscillator 16. The rapid turn-on of horizontal oscillator 16, made possible by this supply of operating voltage immediately after the receiver is turned on, helps to insure that commutation switching signals will be supplied to the gate electrode of commutating SCR 41 before full B+ voltage is supplied to the anode of commutating SCR 41 through half-wave rectifier diode 94 and the other B+ supply circuitry consisting of capacitors 92, 93 and 95, resistors 91, 96, 97 and 151, and blocking diode 90.

After commutation switching has been established, the voltage across capacitor 142 will rise by virtue of the rectification by diode 146 of the voltage generated across winding 60c. This voltage may then be supplied from capacitor 142 through voltage dropping resistor 148 and blocking diode 149 to horizontal oscillator 16.

It should further be noted that operating voltage will continue to be supplied to horizontal oscillator 16 from capacitor 142 through resistor 148 and diode 149 after switch 99 is opened to turn off the television receiver. This voltage is present until capacitor 142 discharges. This voltage allows the horizontal oscillator to continue to supply commutation gating pulses to the gate of SCR 41 as the boosted B+ voltage across capacitor 92 rapidly decays to zero volts by switching of SCR 41. This provision also prevents loss of commutation and tripping of circuit breaker 98 through cycles of rapid switching off and on of the receiver since horizontal oscillator 16 will continue to run for a time after switch 99 is opened.

Other load circuits in block 12 may be supplied with direct current operating voltage by rectifying the voltage obtained from windings such as winding 80c of horizontal output transformer 80, or from capacitor 142. Other current limiting resistors such as resistor 148 may be used to lower the regulated operating voltage supplied by the operation of the boosted B+ regulator circuit.

What is claimed is:

1. A boost voltage delay system for switching loss protection in a deflection system comprising:
   a deflection winding;
   a source of direct current voltage;
   inductive means coupled to said direct current voltage source;
   first and second deflection switching means coupled to each other and to said inductive means and said deflection winding, said first switching means operative from a first to a second state for providing a current path through said inductive means for a portion of each deflection cycle;
   controllable voltage generating and rectifying means coupled to said direct current voltage supply and to said inductive means for generating, rectifying and adding boost voltage to said direct current voltage is response to said flow of current through said inductive means; and
   boost voltage delaying means including rectifying means coupled to said inductive means and to said controllable voltage generating and rectifying means for generating signals in response to said flow of current through said inductive means and for rectifying said signals in said rectifying means for supplying a delayed control voltage for said controllable voltage generating and rectifying means for delaying the supply of said rectified boost voltage to said first switching means.

2. A boost voltage delay system according to claim 1 wherein:
   said delayed control voltage is provided by charging a resistance-capacitance time constant circuit from said generated and rectified signals to a predetermined threshold voltage.

3. A boost voltage delay system according to claim 2 wherein:
   said resistance-capacitance time constant circuit is coupled to a control electrode of an active current conducting device, the main current conducting path of which is coupled to said controllable voltage generating and rectifying means for supplying said delayed control voltage thereto.

4. A boost voltage delay system according to claim 3 wherein:
   said controllable voltage generating and rectifying means includes an active current conducting device which is controlled by said control voltage for rectifying more of said generated boost voltage when said control voltage decreases.

5. A boost voltage delay system for switching loss protection in a television receiver deflection system comprising:
   a source of direct current voltage;
   a deflection rate generator;
   a deflection winding;
   inductive means;
   first switching means coupled to said source of direct current voltage, to said inductive means, to said deflection winding, and to said deflection rate generator for switching in response to signals generated by said deflection rate generator and for exciting current flow in said inductive means and said deflection winding in response to said switching;
   second switching means coupled to said first switching means and to said deflection winding for switching in response to current flow in said inductive means for exciting current flow in said deflection winding in response to said switching;
   generating and rectifying means coupled to said direct current voltage supply and to said inductive means for generating a boost voltage to be added to said direct current voltage in response to said current flow in said inductive means and for rectifying said boost voltage; and
   boost voltage delaying means including unidirectional current conducting means coupled to said inductive means and to said generating and rectifying means for generating signals in response to said flow of current through said inductive means and for rectifying said signals in said undirectional conducting means thereby supplying a delayed control voltage to said generating and rectifying means and delaying the supply or said rectified boost voltage to said first switching means.

6. A boost voltage delay system according to claim 5 wherein:
   said boost voltage delaying means is coupled through a first conducting path to said deflection rate generator and supplies direct current operating voltage thereto from some predetermined time after energization of said television receiver until some predetermined time after de-energization of said television receiver; and
   a second source of direct current operating voltage is coupled through a second conducting path to said deflection rate generator, said second source of voltage being energized upon energization of said television receiver and de-energized upon of said television receiver and said deflection rate generator deriving operating voltage therefrom immediately upon energization of said receiver and deriving operating voltage from said boost voltage delaying means after de-energization of said receiver, said deflection rate generator thereby being supplied with operating potential for providing switching signals to said first switching means from energization of said receiver until some predetermined time after de-energization of said receiver.

7. A boost voltage delay system according to claim 5 wherein:

said delayed control voltage is provided by charging a resistance-capacitance time constant circuit from said generated and rectified signals to a predetermined threshold voltage.

8. A boost voltage delay system according to claim 7 wherein:

said resistance-capacitance time constant circuit is coupled to a control electrode of an active current conducting device, the main current conducting path of which is coupled to said generating and rectifying means for supplying said control voltage thereto.

9. A boost voltage delay system according to claim 8 wherein:

said generating and rectifying means includes an active current conducting device which is controlled by said control voltage for rectifying more of said generated boost voltage when said control voltage decreases.

* * * * *

UNITED STATES PATENT OFFICE

CERTIFICATE OF CORRECTION

PATENT NO. : 3,891,892

DATED : June 24, 1975

INVENTOR(S) : WALTER BOHRINGER

It is certified that error appears in the above-identified patent and that said Letters Patent are hereby corrected as shown below:

On the title sheet, Foreign Application Priority Data, that portion reading "Sept. 12, 1973 Switzerland 42812/73" should read -- Sept. 12, 1973 Great Britain 42812/73 --. Column 10, line 59, that portion reading"de-energized upon of" should read -- de-energized upon de-energization of --.

Signed and Sealed this

*sixteenth* Day of *September 1975*

[SEAL]

*Attest:*

RUTH C. MASON
*Attesting Officer*

C. MARSHALL DANN
*Commissioner of Patents and Trademarks*